J. L. JACKSON.
WHEEL.
APPLICATION FILED MAR. 11, 1909.

959,058.

Patented May 24, 1910.

Witnesses:
Inventor:
John L. Jackson

UNITED STATES PATENT OFFICE.

JOHN L. JACKSON, OF RIVER FOREST, ILLINOIS.

WHEEL.

959,058.  Specification of Letters Patent.  Patented May 24, 1910.

Application filed March 11, 1909. Serial No. 482,846.

*To all whom it may concern:*

Be it known that I, JOHN L. JACKSON, a citizen of the United States, residing at River Forest, in the county of Cook and State of Illinois, have invented certain new and useful Improvements in Wheels, of which the following is a specification, reference being had to the accompanying drawings.

My invention relates to wheels adapted to be equipped with pneumatic tires, such as wheels for automobiles, etc.

It has for its object to provide an improved wheel which will possess the combined advantages of the quick acting or quick detachable rim and those of what is known as the "demountable rim."

The advantages of a quick detachable tire have long been recognized in the art, and since the advent of the demountable rim, its advantages have also been well understood. Nevertheless, so far as I am aware no one has heretofore provided a satisfactory construction in which the advantages peculiar to the quick acting rim have been retained in a rim which was also demountable or capable of being removed from the wheel with the tire. By my invention, however, I provide a construction by which the rim may be quickly demounted or removed with the tire in place, or be equally quickly applied to the wheel, and also the tire may be readily applied to or readily removed from the rim which carries it. Thus all the advantages of both styles of rim are secured.

Figure 1:
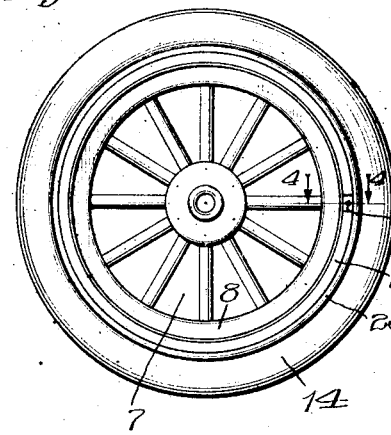
Figure 2:
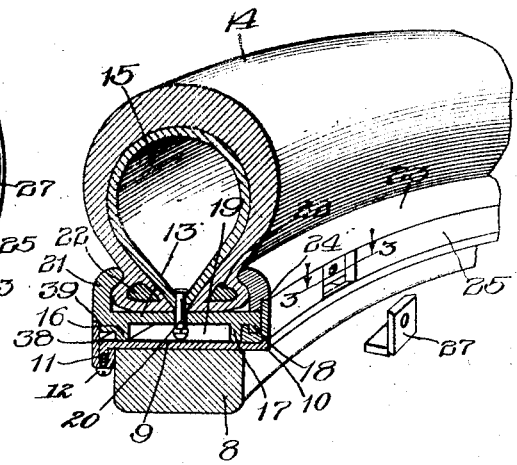
Figure 3:
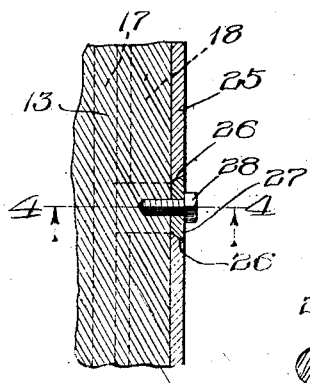
Figure 5:
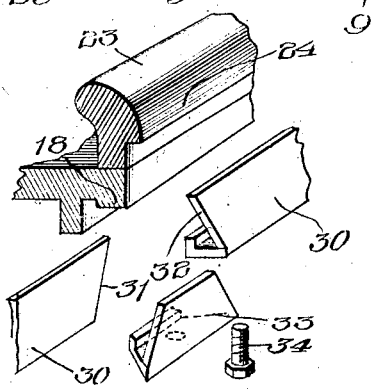
Figure 4:
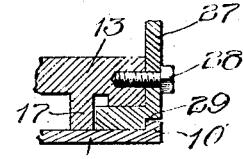
Figure 6:
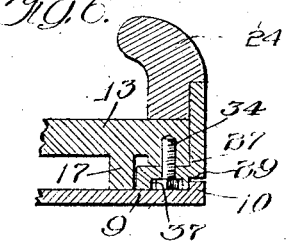
Figure 7:
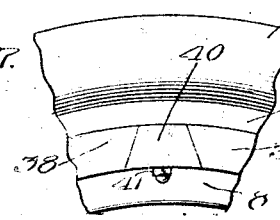

In the accompanying drawings,—Figure 1 is a side view of an automobile wheel illustrating my invention; Fig. 2 is a perspective view of a section of a tire and a portion of the wheel illustrating my improvements; Fig. 3 is an enlarged detail, being a horizontal section on line 3—3 of Fig. 2; Fig. 4 is an enlarged detail, being a sectional view on line 4—4 of Fig. 3; Fig. 5 is a perspective view, showing another arrangement for securing the parts of the rim together; Fig. 6 is an enlarged partial cross-sectional view of the arrangement shown in Fig. 5; and Fig. 7 is a view showing the position and arrangement of the locking bolt by which the rim is secured on the wheel.

Referring to the drawings,—7 indicates the wheel, of which 8 is the felly. The wheel may be of any suitable construction, but is preferably the common "artillery" pattern wooden wheel.

9 indicates a fixed rim in the form of an annular metal plate which is permanently secured upon the felly 8 and projects slightly at each side thereof, as best shown in Fig. 2. At its inner margin the fixed rim 9 is provided with an upwardly-projecting flange 10, and at its outer margin is provided with a downwardly-projecting flange 11. The flange 11 is adapted to receive a bolt 12 for securing a wedge plate thereto, as hereinafter described.

13 indicates a demountable or removable rim or tire supporting member, which carries the usual pneumatic tire composed of a casing 14 and an inner tube 15. The tire supporting member 13 is annular in form and fits closely upon the permanent rim 9, having internally-projecting flanges or supports 16—17 near its side edges, as shown in Fig. 2. At its inner margin the tire supporting member 13 is also provided with a depending flange 18, as shown in Figs. 2, 5 and 6. By supporting the demountable rim as described, a space 19 is provided between the tire supporting member and the permanent rim, which receives the valve-stem 20 and the nuts of retaining clamps or lugs, if such are used. It will be understood that the tire supporting member 13 is provided with a suitable hole for the passage of the valve-stem.

At its outer margin the tire supporting member 13 is provided with an upwardly-projecting flange 21 of the pattern common in clencher rims, being curved inward to engage the usual enlarged side edge 22 of the casing 14. The opposite side edge 22 is secured on the tire supporting member 13 by a detachable flange or ring 23 best shown in Figs. 2, 5 and 6. As therein shown the ring 23 fits upon the tire supporting member 13 over the flange 18 and is provided with a groove in its lower outer edge forming a shoulder 24 which overlies the flange 10 when the ring is in operative position. The ring 23 is secured in place by means of an expansible J-shaped locking ring which engages the flange 18 and fits flush against the inner face of the tire supporting member and the lower portion of the ring 23, its outer face being flush with the shoulder 24, as shown in Fig. 6.

In the construction shown in Figs. 2, 3 and 4. 25 indicates a locking ring the ends of which are beveled, as shown at 26 in Fig. 3, so as to receive a wedge-plate 27 which is adapted to be secured to the tire supporting member 13 by a bolt 28, as best shown in Fig. 4. Obviously, by forcing the wedge-plate 27 laterally between the separated ends 26 of the ring 25, said ring is expanded and forced tightly into engagement with the flange 18 and the ring or flange 23. At this time the lower surface of the locking ring 25 is flush with the lower surfaces of the flanges 16—17. It will be understood, of course, that the locking ring 25 must be applied or removed when the tire supporting member 13 is demounted, but after the locking ring 25 has been secured in position the demountable rim may be readily applied to or removed from the wheel. When in position on the wheel the locking ring 25 and the wedge-plate 27 cannot become displaced as they are held in position by the permanent rim 9 and the flange 10 thereof, which engages the locking ring 25 and limits the inward movement of the demountable rim. The locking ring 25 is provided with a notch 29 in its lower outer corner, as shown in Fig. 4, to receive the flange 10. In Figs. 5 and 6 I have shown another, and my preferred, form of locking device for securing the flange or ring 23 in position. In the latter construction I employ a locking ring 30 similar to the locking ring 25, except that the severed ends of the ring 30 are oppositely beveled in the form shown at 31—32 in Fig. 5, the beveled surfaces being inclined away from each other downwardly instead of away from each other outwardly as in the construction shown in Figs. 2, 3 and 4. With the latter construction a wedge section or plate 33 is employed which is pressed upward between the separated ends of the locking ring 25, forcing them apart in the manner already described. The locking plate 33 is held in position by a bolt 34 which screws into the flange 18, as shown in Figs. 5 and 6. The head of the bolt 34 fits in a recess 37 in the under side of the wedge plate, as shown in Fig. 6, so that it does not project below the lower surface thereof and therefore does not interfere with the application of the demountable rim to the wheel. The construction illustrated in Figs. 5 and 6 is preferable because the bolt 34 cannot become accidentally detached, and, moreover, the wedge-plate 33 may be J-shaped the same as the locking ring and thereby be better secured to the tire supporting member, whereas in the construction shown in Figs. 3 and 4 the locking plate having the construction shown in Fig. 2 is employed in order to permit of its removal by lateral movement.

It will be seen from the foregoing description that the removable rim is constructed as a "quick detachable" rim and has all the advantage of such a rim, and moreover, that when it is applied to the wheel it is impossible for the separable flange or ring thereof to get out of place.

The demountable rim is secured to the permanent rim by devices similar to those already described. That is to say, a J-shaped locking ring 38 is employed which hooks under the depending flange 11 of the permanent rim and engages the outer face of the demountable rim, lying under a shoulder 39 provided at that side of the demountable rim. The locking ring 38 is similar in construction and operation to the locking ring 30 and is secured in position by a wedge-plate 40 similar in all respects to the wedge-plate 33, except that the head 41 of the bolt 12 which holds it in place preferably extends below the lower surface of such wedge-plate.

In order to demount the rim it is necessary only to remove the nut 41 and wedge-plate 40 and detach the locking ring 38, when the entire rim with the tire held by it may be removed from the wheel. Another rim may then be applied, or if it be necessary to remove the tire from the demountable rim that can be accomplished by removing the wedge-plate and locking ring 30, when the ring or flange 23 may be removed and the tire drawn off by a sidewise movement.

That which I claim as my invention and desire to secure by Letters Patent, is,—

1. The combination with a wheel having a fixed rim, of a demountable rim comprising a tire-supporting member having tire-retaining flanges, one of said flanges being removably mounted on the outer surface of said supporting member, means fitting between said fixed rim and the supporting member and detachably connected with said supporting member for holding said removable flange in operative position thereon, and means for detachably securing said supporting member on the fixed rim.

2. The combination with a wheel having a fixed rim, of a demountable rim comprising a tire-supporting member having tire-retaining flanges, one of said flanges being removably mounted on the outer surface of said supporting member, an expansible split ring fitting between said fixed rim and the supporting member and detachably connected with said supporting member for engaging and holding said removable flange on the supporting member, and means for detachably securing said supporting member on the fixed rim.

3. The combination with a wheel having a fixed rim, of a demountable rim comprising a tire supporting member having an inwardly projecting flange, a removable tire retaining flange mounted on the outer surface of said tire supporting member, means secured between said tire supporting member and the fixed rim and detachably engaging said inwardly projecting flange for holding said removable flange on said tire supporting member, and means for detachably securing the demountable rim on the fixed rim.

4. The combination with a wheel having a fixed rim, of a demountable rim comprising a tire supporting member having an inwardly projecting flange, a removable tire retaining flange mounted on the outer surface of said tire supporting member, a channeled split locking ring fitting between said tire supporting member and the fixed rim and detachably engaging said inwardly projecting flange, said locking ring having a portion that projects outwardly beside the tire supporting member and engages said removable flange for holding the same in operative position.

5. The combination with a wheel having a fixed rim provided with an outwardly-projecting flange at its inner margin, of a demountable rim comprising a tire supporting member having an inwardly - projecting flange adjacent to its inner margin, a removable tire-retaining flange mounted on said tire supporting member, an expansible ring fitting between said tire supporting member and the fixed rim, said expansible ring being adapted to embrace said inwardly-projecting flange and engaging said tire-retaining flange for holding said flange on the tire supporting member, and means for detachably securing the demountable rim on the fixed rim.

6. The combination with a wheel having a fixed rim provided with an outwardly-projecting flange at its inner margin, of a demountable rim comprising a tire supporting member having an inwardly-projecting flange adjacent to its inner margin, a removable tire-retaining flange mounted on said tire supporting member, an expansible ring fitting between said tire supporting member and the fixed rim, said expansible ring being adapted to embrace said inwardly-projecting flange and engaging said tire-retaining flange for holding said flange on the tire supporting member, a wedge for expanding said ring, said wedge being secured to said tire supporting member and engaging the outwardly-projecting flange of the fixed rim, and means for detachably securing the demountable rim on the fixed rim.

JOHN L. JACKSON.

Witnesses:
MINNIE A. HUNTER,
W. H DE BUSK.